(12) United States Patent (10) Patent No.: US 8,303,362 B2
Miyazaki et al. (45) Date of Patent: Nov. 6, 2012

(54) MANUFACTURING APPARATUS FOR THREE-DIMENSIONAL IMAGE DISPLAY AND THREE-DIMENSIONAL IMAGE DISPLAY MANUFACTURING METHOD

(75) Inventors: Kentaro Miyazaki, Yokohama (JP); Takashi Miyauchi, Kawasaki (JP); Takeshi Morita, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 483 days.

(21) Appl. No.: 12/639,397

(22) Filed: Dec. 16, 2009

(65) Prior Publication Data

US 2010/0151761 A1 Jun. 17, 2010

(30) Foreign Application Priority Data

Dec. 17, 2008 (JP) ................................. 2008-320987

(51) Int. Cl.
*H01J 9/26* (2006.01)
*H01J 9/42* (2006.01)
(52) U.S. Cl. ............................................ 445/3; 445/23
(58) Field of Classification Search .................. 445/1–4, 445/23–25, 44, 62–66
See application file for complete search history.

(56) References Cited

U.S. PATENT DOCUMENTS

| 5,956,001 A * | 9/1999 | Sumida et al. ................... 345/55 |
| 2004/0180602 A1* | 9/2004 | Hiroki .............................. 445/61 |
| 2008/0088752 A1* | 4/2008 | Kim et al. ........................ 349/15 |
| 2009/0097115 A1* | 4/2009 | Miyazaki et al. .............. 359/463 |

FOREIGN PATENT DOCUMENTS

JP 3708112 8/2005
* cited by examiner

*Primary Examiner* — Anh Mai
*Assistant Examiner* — Nathaniel Lee
(74) *Attorney, Agent, or Firm* — Oblon, Spivak, McClelland, Maier & Neustadt, L.L.P.

(57) ABSTRACT

A manufacturing apparatus for a three-dimensional image display includes a control unit configured to cause a display panel bonded to a lens plate while being housed in a decompression chamber to display an inspection chart, to cause an image capture to capture images of the inspection chart multiple times along with an increase in a decompression degree inside the decompression chamber while causing a decompressor to decompress the inside of the decompression chamber, to obtain variance of luminance distribution for each of the images captured by the image capture, to obtain change information of the variance that changes depending on a change in the decompression degree inside the decompression chamber, and to obtain the decompression degree at a change point of the variance based on the obtained change information of the variance.

6 Claims, 8 Drawing Sheets

MANUFACTURING APPARATUS FOR THREE-DIMENSIONAL IMAGE DISPLAY AND THREE-DIMENSIONAL IMAGE DISPLAY MANUFACTURING METHOD

CROSS REFERENCE OF THE RELATED APPLICATION

This application is based on and claims the benefit of priority from Japanese Patent Application No. 2008-320987, filed on Dec. 17, 2008; the entire contents of which are incorporated herein by reference.

BACKGROUND OF THE INVENTION

1. Field of the Invention

The present invention relates to a manufacturing apparatus for a three-dimensional image display and a three-dimensional image display manufacturing method.

2. Description of the Related Art

There are various three-dimensional image display systems for three-dimensional image displays including a multi-view type, an integral imaging type, and the like. A three-dimensional image display provided with a lenticular lens on a display panel has been developed as one of the three-dimensional image displays using these types of systems. In the case of using the lenticular lens, it is possible to view a three-dimensional image without three-dimensional viewing glasses.

As the display panel, various flat panel type displays are usually used such as a liquid crystal display panel (LCD) configured to control light intensity by use of orientations of liquid crystals, a plasma display panel (PDP) configured to cause fluorescent bodies to emit light by using ultraviolet rays from a plasma discharge, a field emission display panel (FED) configured to cause fluorescent bodies to emit light by using an electron beam from a field-emission-type electron emission element, and a surface-conduction electron-emitter display panel (SED) configured to cause fluorescent bodies to emit light by using an electron beam from a surface-conduction-type electron emission element.

When the lenticular lens is provided on such a display panel, a lens plate including the lenticular lens is usually attached to the display panel by use of an adhesive which is coated in a rectangular frame shape on the display panel. Here, in order to improve light use efficiency, there has also been disclosed a technique for providing a lenticular lens on a liquid crystal display panel (see JP-B No. 3708112, for example).

Meanwhile, among the above-described three-dimensional image displays, there has also been developed a three-dimensional image display employing a decompressed structure between a lens plate and a display panel for the purpose of achieving high display quality. Specifically, an internal space formed by the lens plate, the display panel, and the adhesive is decompressed. When an internal pressure (the pressure of the internal space) of the three-dimensional image display is measured for inspecting the image display, the display is partially destroyed so that the internal pressure of the display can be measured with a pressure gauge.

However, when the internal pressure of the display is measured by partially destroying the product as described above, the product cannot be used after the inspection due to the necessity of destruction. As a consequence, the display is wasted. Moreover, if the internal pressure of the display is beyond a standard range, a gap between the display panel and the lenticular lens exceeds an allowable range and a view angle error also exceeds an allowable range. Hence, display quality of the three-dimensional image is degraded.

SUMMARY OF THE INVENTION

An object of the present invention is to provide a manufacturing apparatus for a three-dimensional image display and a three-dimensional image display manufacturing method, which are capable of measuring an internal pressure of a three-dimensional image display in a nondestructive manner and thereby preventing degradation in display quality of a three-dimensional image without wasting the three-dimensional image display.

A first aspect of the present invention provides a manufacturing apparatus for a three-dimensional image display formed in a way that a display panel including a plurality of pixels arranged within a plain of the display panel, and a lens plate provided with a lenticular lens are bonded together so as to seal the lenticular lens therein, the lenticular lens including a plurality of cylindrical lenses sequentially arranged in a width direction orthogonal to a ridge direction of the cylindrical lenses. The manufacturing apparatus for a three-dimensional image display includes: a decompression chamber; a decompressor configured to decompress inside of the decompression chamber; an image capture configured to capture an image of the display panel through the lens plate, the display panel bonded to the lens plate while being housed in the decompression chamber; and a control unit configured to control the display panel, the decompressor, and the image capture. In the manufacturing apparatus, the controller causes the display panel bonded to the lens plate while being housed in the decompression chamber to display an inspection chart designed to turn on a pixel row located in the center of a cylindrical lens width of each of the plurality of the cylindrical lenses, the controller causes the image capture to capture images of the inspection chart a plurality of times along with an increase in a decompression degree inside the decompression chamber while causing the decompressor to decompress the inside of the decompression chamber in which the display panel bonded to the lens plate is housed, and the control unit obtains variance of luminance distribution in a direction orthogonal to the pixel row for each of the images captured by the image capture, then obtains change information of the variance that changes depending on a change in the decompression degree inside the decompression chamber, and obtains the decompression degree at a change point of the variance based on the obtained change information of the variance.

A second aspect of the present invention provides a three-dimensional image display manufacturing method of manufacturing a three-dimensional image display in a way that a display panel including a plurality of pixels arranged within a plane of the display panel and a lens plate provided with a lenticular lens are bonded to each other so as to seal the lenticular lens therein, the lenticular lens including a plurality of cylindrical lenses sequentially arranged in a width direction orthogonal to a ridge direction of the cylindrical lenses. The three-dimensional image display manufacturing method includes the steps of: causing the display panel bonded to the lens plate while being housed in the decompression chamber to display an inspection chart designed to turn on a pixel row located in the center of a cylindrical lens width of each of the plurality of the cylindrical lenses; capturing images of the inspection chart a plurality of times along with an increase in a decompression degree inside the decompression chamber while decompressing the inside of the decompression chamber in which the display panel bonded to the lens plate is housed; and obtaining variance of luminance distribution in a direction orthogonal to the pixel row for each of the captured images, then obtaining change information of the variance that changes depending on a change in the decompression degree inside the decompression chamber, and obtaining the decompression degree at a change point of the variance based on the obtained change information of the variance.

DESCRIPTION OF THE PREFERRED EMBODIMENTS

An embodiment of the present invention will be described with reference to the accompanying drawings.
(Three-Dimensional Image Display)

Figure 1:
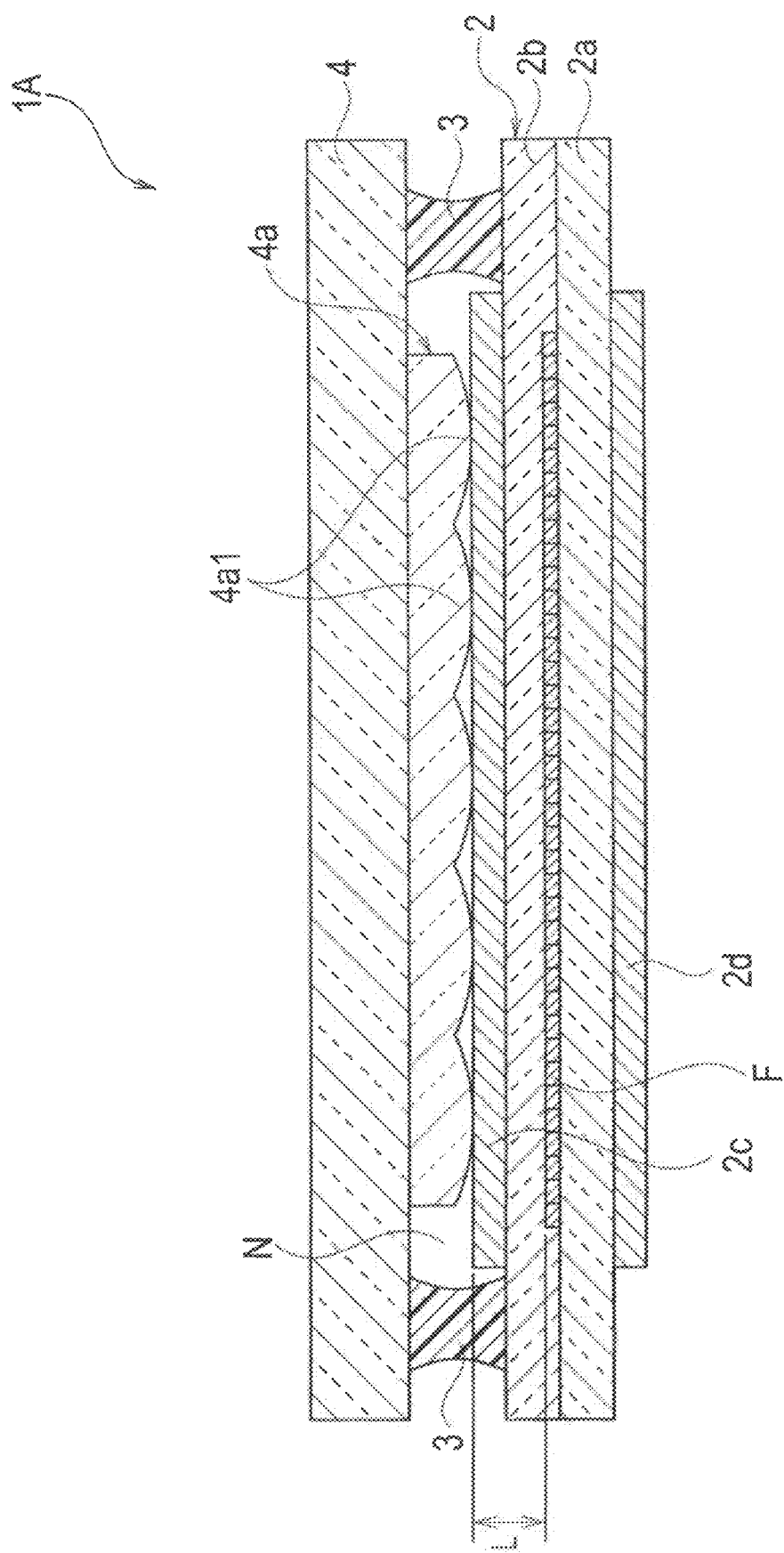
FIG. 1 is a cross-sectional view showing a schematic configuration of a display according to an embodiment of the present invention.

As shown in FIG. 1, a three-dimensional image display (hereinafter referred to as display) 1A according to an embodiment of the present invention includes a display panel 2 configured to display images, and a lens plate 4 provided on the display panel 2 with a frame shaped adhesive member 3 therebetween and including a lenticular lens 4a on the display panel 2 side. An internal space N formed by the display panel 2, the adhesive member 3, and the lens plate 4 is hermetically sealed and an internal pressure of the internal space N is set to a decompressed state having a lower pressure than the atmospheric pressure.

The display panel 2 includes a first substrate 2a serving as a back face substrate and a second substrate 2b serving as a front face substrate, these substrates being formed of array substrates or the like. Multiple pixels are arrayed in a predetermined pattern such as a matrix form (a lattice form) inside a plane of the display panel 2. A liquid crystal display panel, for example, can be used as the type of display panel 2. A liquid crystal layer (not shown) is provided between the first substrate 2a and the second substrate 2b, and two polarizing plates 2c and 2d are provided on outer surfaces of the display panel 2. The polarizing plates 2c and 2d are disposed on the display panel 2 so as to be opposed from each other.

The first substrate 2a is a rectangular glass substrate, for example. Multiple pixel electrodes and electric wiring for supplying potential to these electrodes (none of those are shown) are formed on an inner surface (a surface facing the second substrate 2b: an upper surface in FIG. 1) of the first substrate 2a. The pixel electrodes are provided in dots so as to correspond to the respective pixels, and the electric wiring is provided in a matrix form (in a lattice form). The second substrate 2b is a rectangular glass substrate, for example. A color filter F, a counter electrode (not shown) serving as a common electrode, and the like are formed on an inner surface (a surface facing the first substrate 2a: a lower surface in FIG. 1) of the second substrate 2b. The color filter F includes multiple color layers (red, green, and blue) provided in dots or in stripes, and a light-shielding layer such as a black matrix.

The adhesive member 3 is a member for bonding the display panel 2 to the lens plate 4, which is provided between the display panel 2 and the lens plate 4 so as to surround a periphery of the lenticular lens 4a. The adhesive member 3 is formed into a frame shape, for example, between the display panel 2 and the lens plate 4. The adhesive member 3 functions as a side wall which forms the internal space N by joining the display panel 2 to the lens plate 4, and also maintains airtightness in the internal space N. A photo-curable resin, for example, can be used as the adhesive member 3.

The lens plate 4 is a lens member, such as a lens substrate or a lens sheet, including the lenticular lens 4a for generating a three-dimensional image. The lens plate 4 is a rectangular substrate, for example. The lenticular lens 4a is formed in a way that cylindrical lenses (cylindrical surface lenses) 4a1 each having a semi-cylindrical shape obtained by splitting a cylinder into two in an axial direction are arranged in an orthogonal direction (a short-side direction) to the axial direction (a longitudinal direction, i.e., a ridge direction). Here, each cylindrical lens 41a is a cylindrical-shaped lens which has a curvature only on one side and therefore includes one curved surface. Meanwhile, the lenticular lens 41 is fixed to the inner surface of the lens plate 4, thereby being provided as a part of the lens plate 4. Here, the lenticular lens 4a and the lens plate 4 may be formed separately and integrated later or may be integrally formed in the first place by use of the same material.

The above-described display 1A applies voltages to the pixel electrodes corresponding to the respective pixels arranged in a matrix form in accordance with image signals (image data), and thereby displays images by changing optical characteristics of the individual pixels (the liquid crystal layer). In particular, the display 1A displays multiple parallax images (two-dimensional images) to form a three-dimensional image by use of an integral imaging method. The parallax images are images viewed slightly differently from each other depending on view angles. The type of three-dimensional image is natural and easily viewable and therefore causes less eyestrain. Moreover, a viewable range of such three-dimensional images is continuous.

Here, a gap may be generated between the lenticular lens 4a and the display panel 2 if the lenticular lens 4a and the display panel 2 are not in complete contact with each other. A vertical distance L (see FIG. 1) representing a gap distance between a convex portion (a lens end) of the lenticular lens 4a and the color filter F needs to be within a predetermined allowable range (within a range defined as a target value±several tens of micrometers, for example). If the gap representing the distance between the display panel 2 and the lens plate 4, or more specifically, the gap between the polarizing plate 2c on the display panel 2 and the convex portion of the lenticular lens 4a of the lens plate 4, for example, is increased, the vertical distance L is beyond the allowable range whereby a view angle error also is beyond an allowable range (beyond a range defined as a target value±several degrees, for example). As a consequence, display quality of a three-dimensional image is degraded.

In the display 1A described above, the internal space N formed by the display panel 2, the adhesive member 3 and the lens plate 4 is hermetically sealed with the internal pressure thereof set to a lower pressure than the atmospheric pressure. In the way, the internal space N is set to a decompressed state in which the internal pressure thereof is lower than the atmospheric pressured. By the lower internal pressure, the display panel 2 is brought into and then is kept in complete contact with the lens plate 4. Hence, the gap, i.e., the vertical distance L falls within the allowable range. As a result, it is possible to set the view angle error within the allowable rang and thereby to prevent degradation in the display quality of a three-dimensional image. In particular, the gap can be prevented from changing after manufacturing, although the display 1A might have such gap change due to various factors such as including flexure caused by its own weight, partial pressure application from outside, and a rise in the ambient temperature. Hence, the vertical distance L can be maintained within the allowable range.

(Manufacturing Apparatus for Three-Dimensional Image Display)

Figure 2:
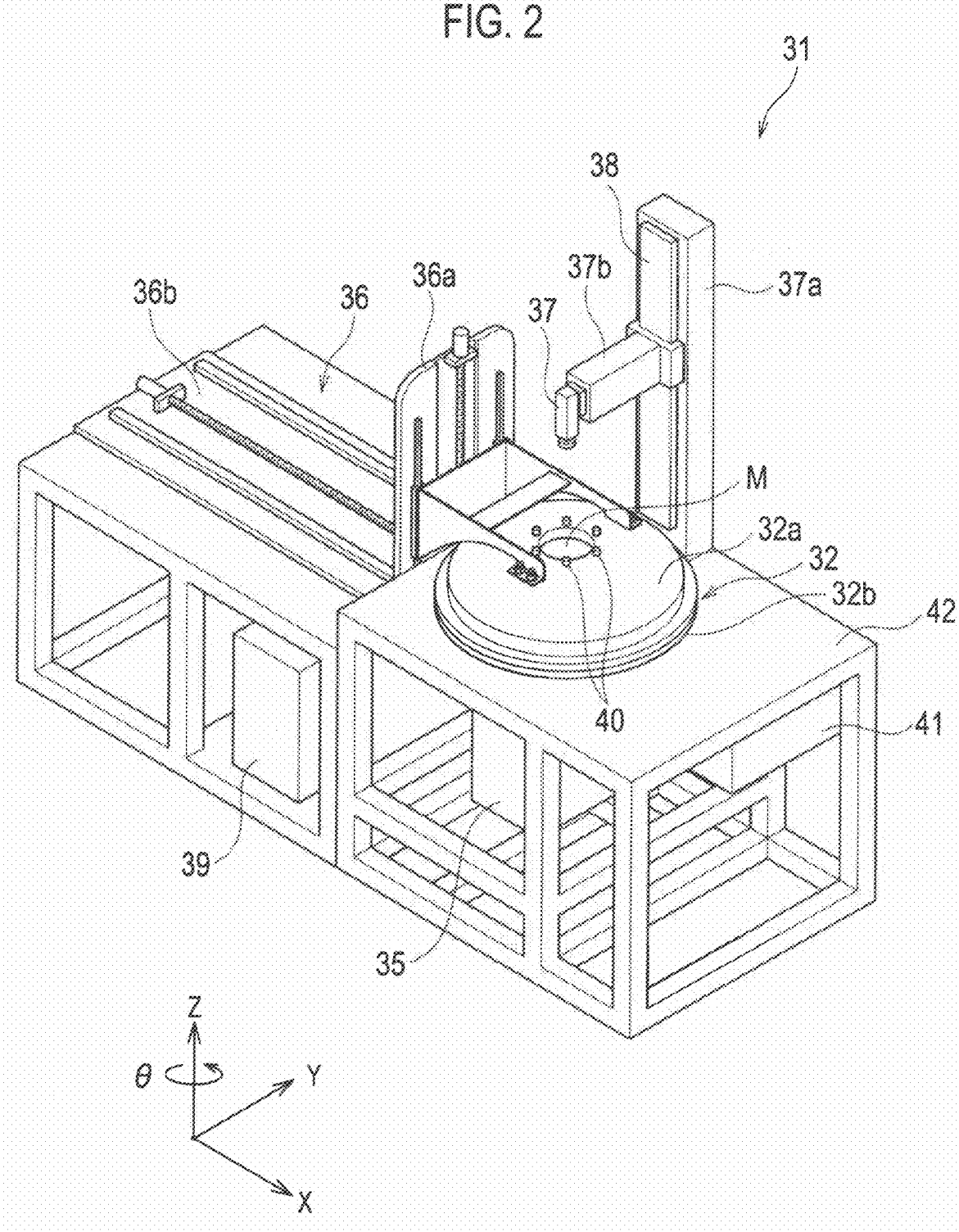
FIG. 2 is an external perspective view showing a schematic configuration of a manufacturing apparatus for a display according to the embodiment of the present invention.
Figure 3:
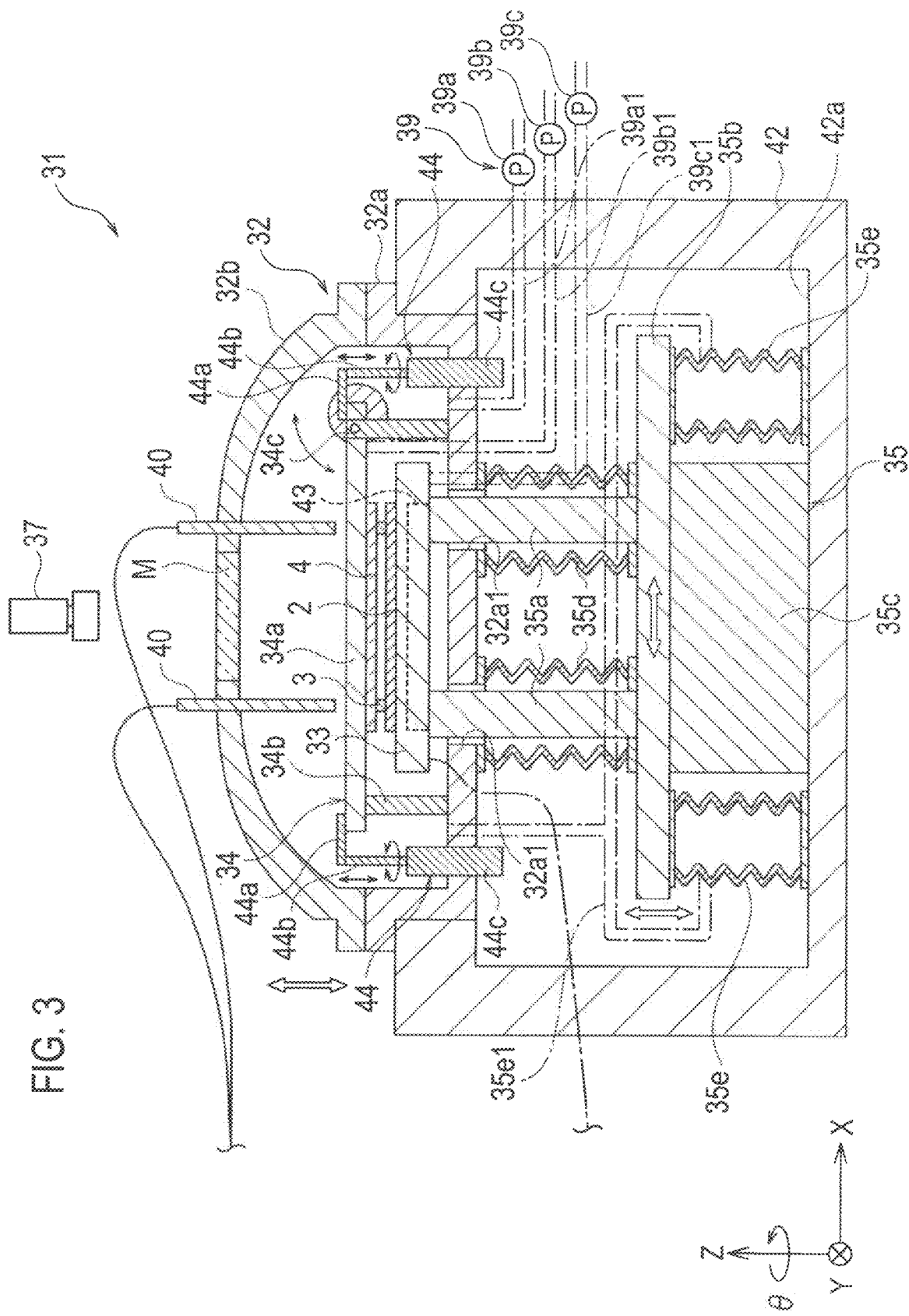
FIG. 3 is a cross-sectional view showing the schematic configuration of the manufacturing apparatus shown in FIG. 2.

As shown in FIG. 2 and FIG. 3, a manufacturing apparatus according to the embodiment of the present invention includes: a decompression chamber 32 having a first chamber 32a and a second chamber 32b; a stage 33 (see FIG. 3) provided inside the decompression chamber 32; a support 34 (see FIG. 3) configured to support the lens plate 4 so that the lens plate 4 can face the stage 33 at a predetermined height; a stage moving mechanism 35 configured to move the stage 33 in X, Y, Z, and θ directions; a chamber moving mechanism 36 (see FIG. 2) configured to move the second chamber 32b in the X axis and Z axis directions; an image capture 37 configured to perform an image capture operation; an image capture moving mechanism 38 (see FIG. 2) configured to move the image capture 37 in the Z axis direction, a decompressor configured to decompress the inside of the decompression chamber 32; multiple irradiation heads 40 configured to irradiate light for curing; and a control unit 41 (see FIG. 3) configured to control each of the units described above. These units and mechanisms are provided to a rack 42.

The decompression chamber 32 is formed to be separable into the first chamber 32a and the second chamber 32b. The decompression chamber 32 turns into a closed state in which the first chamber 32a is integrated with the second chamber 32b and an opened state in which the first chamber 32a is separated from the second chamber 32b. The first chamber 32a is a lower chamber for housing the stage 33 from a lower side while the second chamber 32b is an upper chamber (a lid chamber) for housing the stage 33 from an upper side. A space enclosed by the first chamber 32a and the second chamber 32b, i.e., the inside of the decompression chamber 32 in the closed state is decompressed by the decompressor 39 and turns into a decompressed state (such as a vacuum state) having a lower pressure than the atmospheric pressure.

The stage 33 is a stage configured to hold the display panel 2 by use of a suction-and-adsorption-type holder mechanism (see FIG. 3). The display panel 2 is placed on a holding surface of the stage 33 and is held in that position by the holder mechanism. Here, the adhesive member 3 having a continuous frame shape is coated on a bonding surface of the display panel 2 thus placed.

A light irradiator 43, such as a backlight, for emitting light is provided inside the stage 33 (see FIG. 3). The light irradiator 43 is turned on to allow the display panel 2 to display an image thereon. The light irradiator 43 is electrically connected to the control unit 41 and is turned on and off in accordance with the control by the control unit 41. Here, the stage 33 is provided with an opening portion in a rectangular shape, for example. The opening portion is formed around the center of the stage 33, and the light emitted from the light irradiator 43 enters the display panel 2 through the opening portion.

The support 34 includes a holder frame 34a configured to detachably hold the lens plate 4, and also includes a support plate 34b and a support member 34c configured to support the holder frame 34a at a predetermined height from the stage 33 (see FIG. 3). The holder frame 34a holds the periphery of the lens plate 4 by use of a suction-and-adsorption type holder mechanism. The holder frame 34a is made of metal, for example, in order to obtain required strength. The support plate 34b and the support member 34c are disposed in positions opposed from each other across the stage 33 and are fixed to a bottom face of the first chamber 32a.

The holder frame 34a is provided on an upper end of the support member 34c so as to be rotatable. The holder frame 34a is provided with multiple through holes located around the opening portion on the holder frame 34a, and the light beams emitted from the irradiation heads 40 pass through the respective through holes. In this way, the light for curing is emitted onto the adhesive member 3 located between the display panel 2 and the lens plate 4 in the complete contact state. Moreover, the holder frame 34a is provided with a handle. The holder frame 34a is rotated with the handle grabbed by an operator. When the holder frame 34a comes into contact with an upper end of the support plate 34b while holding the lens plate 4, the lens plate 4 is located at the predetermined height while facing the display panel 2 on the stage 33. In this state, the holder frame 34a is fixed to the upper end of the support plate 34b by multiple fixing members 44.

Each of the fixing members 44 includes: a check member 44a configured to come into contact with the holder frame 34 and to check the holder frame 34a; a rotating shaft 44b fixed to the check member 44a; and a driver 44c configured to move the rotating shaft 44b in the Z axis direction and to rotate the rotating shaft 44b in the θ direction. The fixing members 44 are provided inside the decompression chamber 32. The fixing members 44 move the check members 44a in the θ direction and downward in the Z axis direction (in FIG. 3) by use of the rotating shafts 44b to a fixing position where the holder frame 34a is fixed. Meanwhile, the fixing members 44 move the check members 44a upward in the Z axis direction (in FIG. 3) and in the θ direction by use of the rotating shafts 44b to a standby position where the holder frame 34a is released from the fixing position. Here, even though each of the drivers 44c partially protrudes outward from the decompression chamber 32, the decompression chamber 32 is formed to maintain the airtightness. The protruding portion of the driver 44c is connected to the control unit 41 through a connection line whereby the driver 44c is electrically connected to the control unit 41.

The stage moving mechanism 35 is a moving mechanism configured to move the stage 33 from outside the decompression chamber 32 in the X, Y, Z, and θ directions (see FIG. 3). The stage moving mechanism 35 is provided outside the decompression chamber 32 and is electrically connected to the control unit 41. Note that the θ direction is a rotating direction in an XY plane in FIG. 3.

The stage moving mechanism 35 includes: multiple columns 35a configured to enter the decompression chamber 32 and to support the stage 33; a table 35b to which the columns 35a are fixed; a table moving mechanism 35c configured to support the table 35b and to move the table 35b in the X axis, Y axis, Z axis, and θ directions; multiple first bellows 35d attached between the decompression chamber 32 and the table 35b so as to surround the respective columns 35a, i.e., to house the respective columns 35a therein; and multiple second bellows 35e attached between the table 35b and the rack 42 (i.e., a placement surface 42a of the rack 42 on which the table moving mechanism 35c is placed).

The columns 35a are inserted to the respective through holes 32a1 provided in the bottom face of the first chamber 32a to support the stage 33. One end of each of the columns 35a is fixed to a lower face of the stage 33 while the other end thereof is fixed to the table 35b. The columns 35a are each formed into a cylindrical shape, for example.

The table 35b is placed on the table moving mechanism 35c so as to be movable in the X, Y, Z, and θ directions. The table moving mechanism 35c moves the table 35b in the X, Y, Z, and θ directions and thereby moves the stage 33 in the X, Y, Z, and θ directions through all the columns 35a fixed to the table 35b.

The first bellows 35d and the second bellows 35e are expansive pipes that are expansible and contractible. The first bellows 35d are connected to the inside of the decompression chamber 32 through the respective through holes 32a1 communicating with the inside of the decompression chamber 32. The first bellows 35d also maintain the airtightness of the decompression chamber 32. Meanwhile, the second bellows 35e are connected to the inside of the decompression chamber 32 through a communicating pipe 35e1 communicating with the inside of the decompression chamber 32. The second bellows 35e also maintain the airtightness of the decompression chamber 32. For example, the first bellows 35d and the second bellows 35e may be formed of expansive pipes made of metal having strength strong enough not to be deformed due to the decompression by the decompression chamber 32.

Here, as the decompression in the decompression chamber 32 progresses, the stage 33 is pulled upward (in FIG. 3). For this reason, the table 35b connected to the stage 33 through the columns 35a may be tilted. If the bonding is carried out in this state, the accuracy in the Z (the gap), X, and θ directions may be deteriorated and may exceed an allowable range. To avoid this, the inside of the decompression chamber 32 is communicated with the second bellows 35e through the communicating pipe 35e1, whereby the table 35b can be pulled downward (in FIG. 3) with an approximately equal force to the force to pull the stage 33 upward. In this way, it is possible to prevent a tilt of the table 35b which is connected to the stage 33 through the columns 35a, and thereby to prevent the gap from varying from place to place, and additionally to maintain the accuracy in the Z (the gap), X, and θ directions within the allowable range. Here, the size, the number, and other features of the second bellows 35e are determined to so as to generate the approximately equal force to the force to pull the stage 33 upward.

The above-described stage moving mechanism 35 moves the stage 33 in the X, Y, and θ directions while aligning the display panel 2 with the lens plate 4 (the lenticular lens 4a) and moreover, moves the display panel 2 in the Z axis direction while performing fine adjustment in the X and θ directions to bond the display panel 2 to the lens plate 4. Specifically, the stage moving mechanism 35 functions as a moving mechanism configured to perform a moving operation of moving the display panel 2 and the lens plate 4 relative to each other. Here, the alignment is carried out based on alignment marks respectively provided on ends of the display panel 2 and on ends of the lens plate 4, alignment marks displayed on the display panel 2, and the like. These alignment marks are captured with an alignment camera, the image capture 37, or the like.

The chamber moving mechanism 36 includes: a Z axis moving mechanism 36a configured to move the second chamber 32b in the Z axis direction; and an X axis moving mechanism 36b configured to move the Z axis moving mechanism 36a in the X axis direction (see FIG. 2). The chamber moving mechanism 36 is electrically connected to the control unit 41. When an operator attaches the display panel 2 and the lens plate 4 to the stage 33 and the holder frame 34a, the above-described chamber moving mechanism 36 moves the second chamber 32b to a retreated position. Moreover, when the display panel 2 is bonded to the lens plate 4, the chamber moving mechanism 36 moves the second chamber 32b to a closed position of the decompression chamber 32.

The image capture 37 captures an image, for example, an image displayed on the display panel 2, by performing an image capturing operation on the display panel 2 through the lens plate 4 at a viewing distance. The image capture 37 is provided on the image capture moving mechanism 38 so as to be movable in the Z axis direction (the vertical direction in FIG. 3) which is directions to come close to and go away from the stage 33. Meanwhile, the image capture 37 is electrically connected to the control unit 41. The image capture 37 may be formed of a CCD (charge coupled device) camera, for example. A focusing operation of the image capture 37 is achieved by vertical movement of the image capture 37 using the image capture moving mechanism 38 or by an automatic focusing function.

The image capture moving mechanism 38 is a moving mechanism provided on a column 37a fixed onto the rack 42 so as to extend in the Z axis direction and is configured to move the image capture 37 in the Z axis direction (see FIG. 2). The image capture moving mechanism 38 is fixed to the column 37a and is electrically connected to the control unit 41. The image capture moving mechanism 38 may be formed of a linear motor mechanism or a feed screw mechanism, for example. Note that the image capture 37 is provided to the image capture moving mechanism 38 with a support member 37b, such as an arm member, interposed therebetween.

The decompressor 39 includes: a first suction pump 39a configured to evacuate a gas (an atmosphere) such as air inside the decompression chamber 32; a second suction pump 39b configured to provide the holder frame 34a with a suction force; a third suction pump 39c configured to provide the stage 33 with a suction force; and the like (see FIG. 3). The first suction pump 39a evacuates the atmosphere inside the decompression chamber 32 through an exhaust pipe 39a1 communicating with the inside of the decompression chamber 32. The second suction pump 39b evacuates the atmosphere from all suction grooves on the holder frame 34a through an exhaust pipe 39b1 communicating with all the suction grooves. The third suction pump 39c evacuates the atmosphere from all suction grooves on the stage 33 through an exhaust pipe 39c1 communicating with all the suction grooves. The first suction pump 39a, the second suction pump 39b, and the third suction pump 39c are electrically connected to the control unit 41 and are driven under control of the control unit 41.

The irradiation heads 40 are provided to the second chamber 32b and located in positions on a frame-shaped line around a window M of the second chamber 32b. The window M of the second chamber 32b is formed in the second chamber 32b by use of a transparent material such as glass so as to enable the image capture 37 to capture images. The irradiation heads 40 emit light beams onto the adhesive member 3 located between the display panel 2 and the lens plate 4 in the complete contact state and partially cures the adhesive member 3. At this time, the light beams emitted from the irradiation heads 40 pass through the respective through holes in the holder frame 34a and reach the adhesive member 3.

The control unit 41 includes: a controller configured to intensively control each of the units and mechanisms; a storage unit configured to store various programs and various data; and an operation unit configured to receive an input operation from the operator (none of them are shown). The storage unit includes a RAM (random access memory) that functions as a work area for the controller, a nonvolatile memory, a hard disk drive, and so forth. The control unit 41 controls each of the units and mechanisms based on the various programs, the various data, and the like which are stored in the storage unit. In particular, the control unit 41 executes a series of data processing for calculating or manipulating the data, the bonding process of bonding the display panel 2 to the lens plate 4, and so forth. The bonding process includes an alignment process of performing alignment, a decompression process of performing decompression, an inspection process of performing inspection, and other necessary processes. In addition, image capture conditions, bonding conditions (including decompressing conditions), inspecting conditions, and the like are stored in the storage unit.

(Manufacturing Method for Three-Dimensional Image Display)

Next, a manufacturing method for the display 1A by use of the above-described manufacturing apparatus 31 will be described. Here, the control unit 41 of the manufacturing apparatus 31 executes the bonding process and controls all the units and mechanisms. The bonding process also includes the inspection process for inspecting the product quality of the display 1A. In the beginning, the display panel 2 coated with the adhesive member 3 is placed on the stage 33 and the lens plate 4 is located, with the holder frame 34a closed, in such a predetermined position as to face the display panel 2 above the stage 33 (see FIG. 3).

Figure 4:
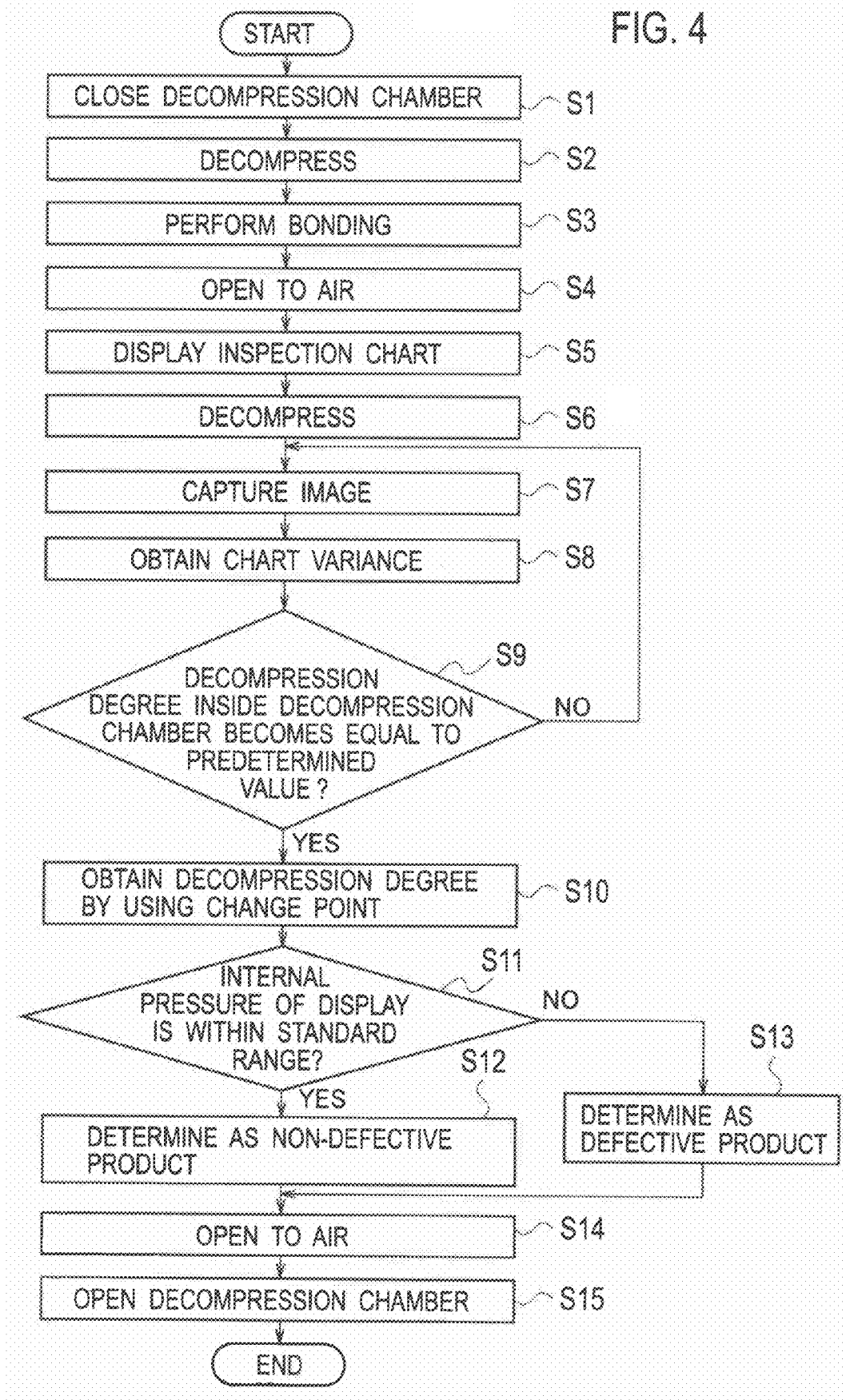
FIG. 4 is a flowchart showing a bonding process flow executed by the manufacturing apparatus shown in FIGS. 2 and 3.

As shown in FIG. 4, the control unit 41 moves the second chamber 32b of the decompression chamber 32 to the closed position by use of the chamber moving mechanism 36 and thereby closes the decompression chamber 32 (step S1). Then, the control unit 41 drives the first suction pump 39a to evacuate the atmosphere inside the decompression chamber 32 through the exhaust pipe 39a1 communicating with the inside of the decompression chamber 32, thereby decompressing the inside of the decompression chamber 32 until the inner pressure becomes a predetermined vacuum pressure (step S2).

Subsequently, the control unit 41 moves the stage 33 in the X, Y, Z, and θ directions by use of the stage moving mechanism 35 to perform alignment of the display panel 2 and the lenticular lens 4a in a planar direction between by moving the display panel 2 relatively to the lens plate 4. Moreover, the control unit 41 moves the stage 33 upward in the Z axis direction (in FIG. 3) by use of the stage moving mechanism 35, then presses the display panel 2 against the lens plate 4, and emit light for curing from the irradiation heads 40, thereby bonding the display panel 2 to the lens plate 4 (step S3).

Thus, the frame-shaped adhesive member 3 is partially cured with the lens plate 4 and the display panel 2 being in complete contact with each other. In this way, the display panel 2 and the lens plate 4 are bonded to each other in the decompressed atmosphere so as to seal the lenticular lens 4a therein. In addition, the internal space of the display 1A, i.e., the internal space N formed by the display panel 2, the adhesive member 3, and the lens plate 4 is hermetically sealed with a lower internal pressure than the atmospheric pressure. As a consequence, the display 1A having a decompressed structure is formed.

Thereafter, the control unit 41 stops driving the second suction pump 39b for adsorption to release the lens plate 4 from the adsorption, then moves the stage 33 downward in the Z axis direction (in FIG. 3) by use of the stage moving mechanism 35, and stops driving the first suction pump 39a to open the inside of the decompression chamber 32 to the atmosphere (step S4).

Next, the control unit 41 displays an inspection chart G1 functioning as an inspection image (step S5). Specifically, the control unit 41 causes the light irradiator 43 to perform an irradiating operation, and thereby causes the display panel 2 to display the inspection chart G1 (see FIG. 5) thereon. Here, the irradiating operation is an operation to irradiate the display panel 2 on the stage 33 with light for image display. Incidentally, data for the inspection chart G1 is stored in the storage unit.

Figure 5:
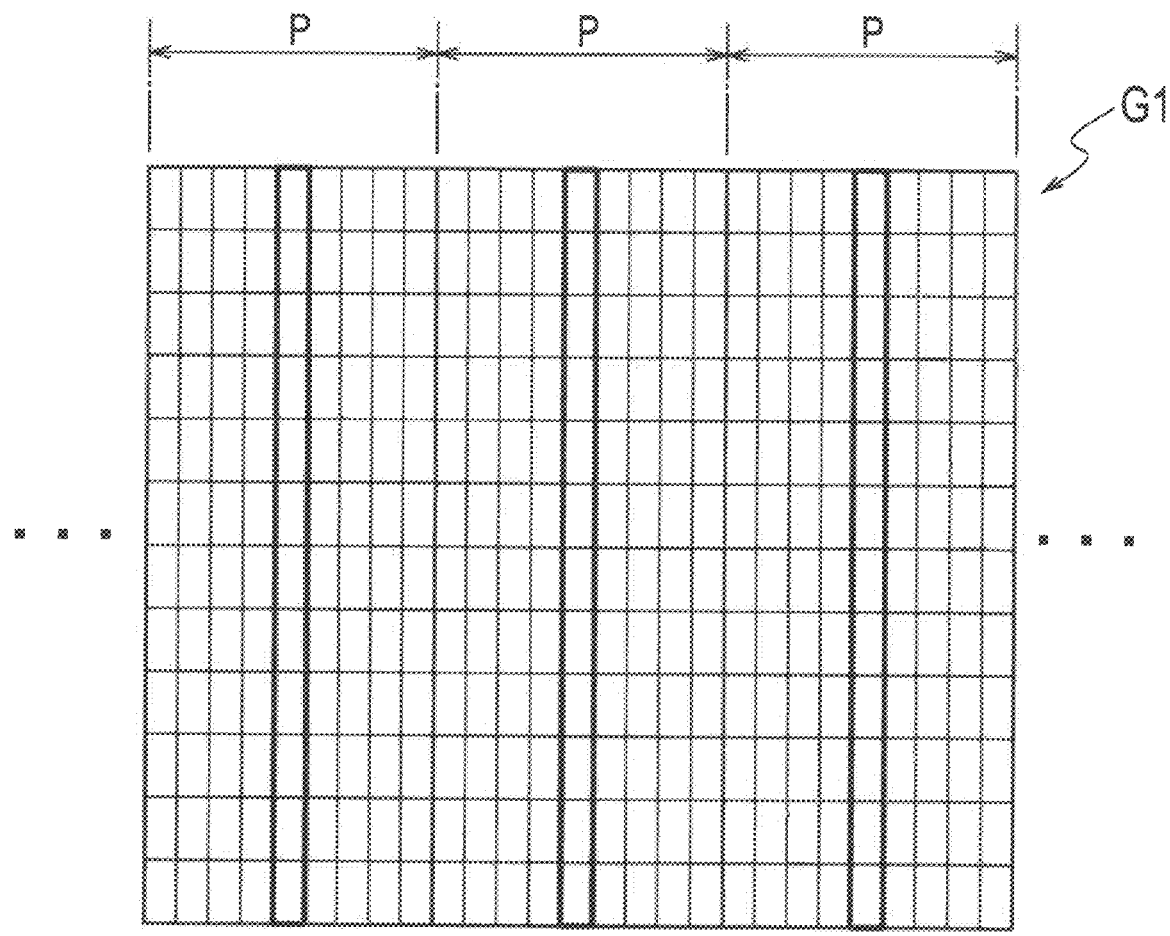
FIG. 5 is a plan view showing an example of an inspection chart to be displayed on a display panel.

As shown in FIG. 5, the inspection chart G1 is a chart designed to turn on a line of pixels in each lens pitch P of the lenticular lens 4a, more specifically, a line of pixels in the center of each lens pitch P. To be more precise, the inspection chart G1 is a stripe chart designed to turn on a line of pixels of a line (a pixel row) that is a reference line (such as a center line) of the display panel 2, and to turn on pixel rows arranged in a direction orthogonal to the reference line from the reference line at intervals of lens pitch P of the lenticular lens 4a. Here, the reference line is a line based on which various parts of a three-dimensional image are designed. The lens pitch P of the lenticular lens 4a is a width of the cylindrical lens 4a1, i.e., the width in a direction orthogonal to the axial direction (the ridge direction) of the cylindrical lens 4a1. The inspection chart G1 is displayed on a display screen of the display panel 2.

Figure 6:
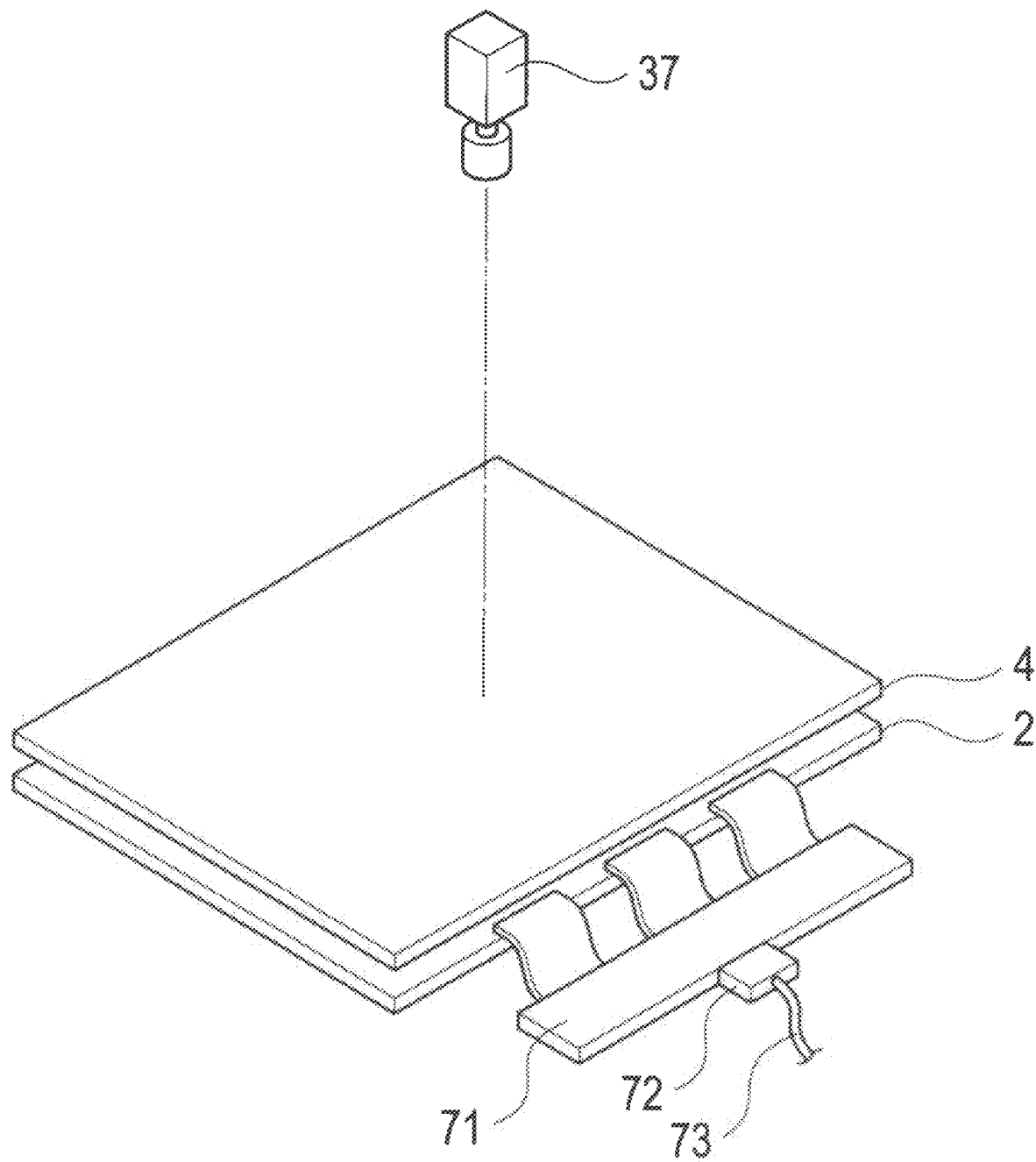
FIG. 6 is an explanatory view for explaining electrical connection between the manufacturing apparatus shown in FIGS. 2 and 3 and the display panel.

Here, the display panel 2 is electrically connected to the control unit 41 in order to display the inspection chart G1 thereon. As shown in FIG. 6, the display panel 2 is provided with a signal interface 71. A transmission line 73 is connected to the signal interface 71 via a connector 72. The transmission line 73 is s line connected to the control unit 41 and is configured to transmit an inspection chart signal generated by the control unit 41 to the signal interface 71 of the display panel 2. Meanwhile, the connector 72 is formed to be detachably attachable to the signal interface 71 and is provided on one end of the transmission line 73. Here, the control unit 41 functions as a generator which generates the inspection chart signal of the inspection chart G1.

Subsequently, while decompressing the inside of the decompression chamber 32 (step S6), the control unit 41 captures an image of the displayed inspection chart G1 (step S7). Specifically, the control unit 41 drives the first suction pump 39a to evacuate the atmosphere inside the decompression chamber 32 through the exhaust pipe 39a1 communicating with the inside of the decompression chamber 32, thereby decompresses the inside of the decompression chamber 32, and also causes the image capture 37 to execute the image capture operation. Here, the image capture operation is the operation to capture an image of the display 1A on the stage 33 from a side of the lens plate 4.

Figure 7:
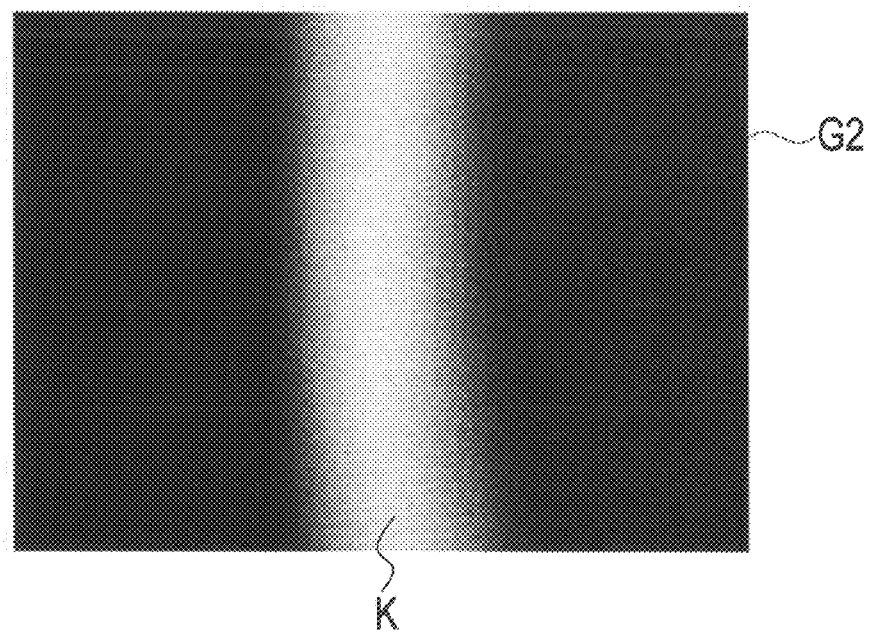
FIG. 7 is a plan view showing an example of a captured image when an internal pressure of the display is within a standard range.

As a result, an image G2 shown in FIG. 7 is obtained. The image G2 shown in FIG. 7 is an example of the image when the internal pressure of the display 1A (the pressure in the internal space N) is within the standard range. Here, a bright line K is observed in the image G2. The bright line K varies with a variation in the internal pressure of the display 1A. For example, depending on a variation in the internal pressure, the width of the bright line K may be increased or two or more bright lines K may appear.

Thereafter, the control unit 41 obtains chart variance from the captured image (step S8) and judges whether or not a decompression degree inside the decompression chamber 32 becomes equal to a predetermined value (step S9). The control unit 41 repeats the foregoing steps S7 and S8 until the decompression degree inside the decompression chamber 32 becomes equal to the predetermined value (NO in step S9). In this way, both of the chart variance and its corresponding decompression degree are obtained for each of the captured images and are sequentially stored in the storage unit. Incidentally, the decompression degree inside the decompression chamber 32 is measured with a pressure gauge or the like and is transmitted to the control unit 41.

Figure 8:
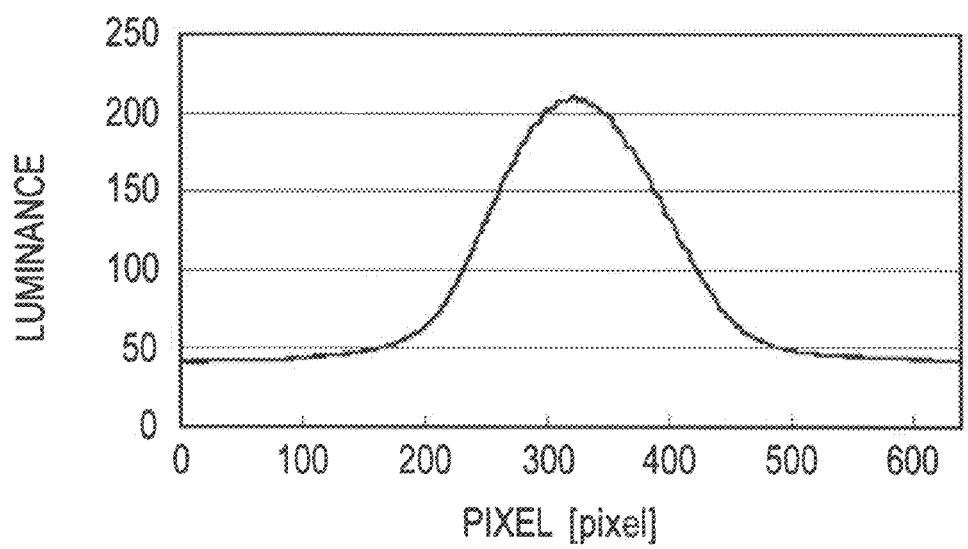
FIG. 8 is an explanatory view for explaining luminance distribution in an X axis direction of the captured image shown in FIG. 7.

In the calculation of the chart variance, the controller 41 performs image processing on the captured image, calculates luminance distribution in the X axis direction (the direction orthogonal to the pixel row), then smoothes the calculated luminance distribution with a smoothing filter to allow the luminance distribution to approximate normal distribution, and then calculates the chart variance by use of the luminance distribution after the approximation. Here, the luminance distribution in the X axis direction is the luminance distribution in the direction orthogonal to the pixel row located in the center of the lens pitch P. For example, luminance distribution shown in FIG. 8 is obtained when the image G2 shown in FIG. 7 is subjected to image processing and smoothing.

In step S9, when the decompression degree inside the decompression chamber 32 is judged as equal to the predetermined value (YES in step S9), change information of the chart variance that changes with a change in the decompression degree inside the decompression chamber 32 is obtained and then a change point of the chart variance is determined on the basis of the change information and then obtains the decompression degree at the change point (step S10). The decompression degree thus obtained is the internal pressure of the display 1A.

Figure 9:
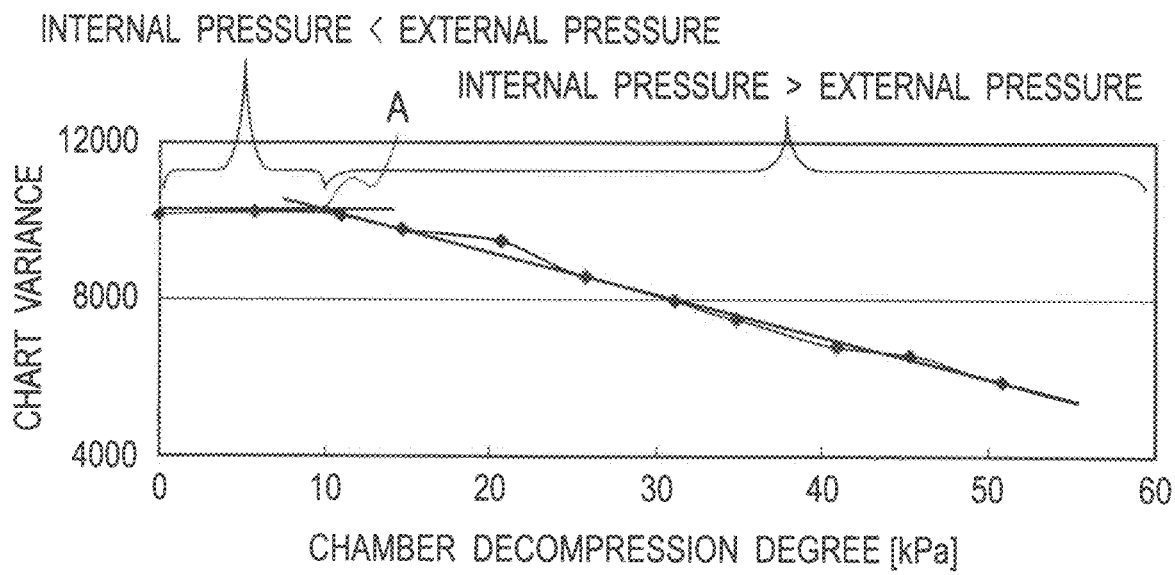
FIG. 9 is an explanatory view for explaining a relation between a chamber decompression degree and chart variance (change information of the chart variance).

For example, as shown in FIG. 9, the change information of the chart variance is obtained, then a change point A is determined as the point of change in the chart variance, and thereafter the decompression at the change point A (10 kPa in FIG. 9) is obtained as the internal pressure of the display 1A. In FIG. 9, linear approximation is applied to the chart variance of dots at which the chart variance hardly changes along with an increase in the chamber decompression degree (the decompression degree inside the decompression chamber 32), and a least square method or linear approximation is applied to the chart variance of dots at which the chart variance decreases along with the increase in the chamber decompression degree. Then, an intersection of two lines thus obtained is determined as the change point A. Here, the method of determining the change point A is not limited only to the above-described one. For example, it is also possible to determine as the change point A first dot at which the chart variance decreases by an amount of a predetermined value or more along with the increase in the chamber decompression degree.

The decompression degree at the change point A is the internal pressure of the display 1A. In addition, as shown in FIG. 9, the internal pressure of the display 1A is smaller than an external pressure (the chamber decompression degree) in a range where the chart variance does not change. Meanwhile, the internal pressure of the display 1A is greater than the external pressure (the chamber decompression degree) in a range where the chart variance gradually decreases along with the increase in the chamber decompression degree.

Figure 10:
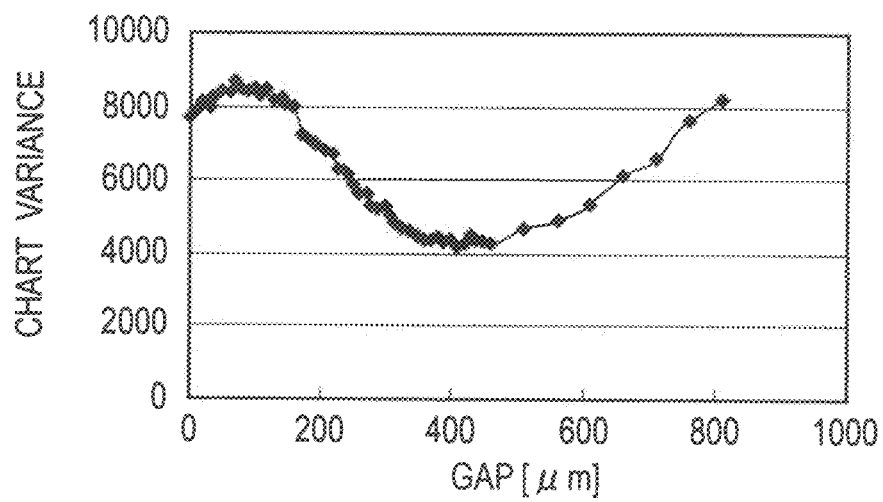
FIG. 10 is an explanatory view for explaining a relation between a gap and the chart variance.

When the inside of the decompression chamber 32 housing the display 1A is decompressed and the internal pressure of the display 1A becomes greater than the decompression degree inside the decompression chamber 32 which is the external pressure, the internal space N of the display 1A is expanded and thereby the gap is increased. In this case, the chart variance changes due to such increase in the gap, as described above. Here, as shown in FIG. 10, the chart variance and the gap have a relationship in which the chart variance changes according to a variation in the gap.

Then, the control unit 41 judges whether or not the internal pressure of the display 1A is within the standard range (step S11). When the internal pressure of the display 1A is judged as within the standard range (YES in step S11), the display 1A is determined as a non-defective product (step S12). On the other hand, when the internal pressure of the display 1A is judged as beyond the standard range (NO in step S11), the display 1A is determined as a defective product (step S13).

Here, a case where the internal pressure of the display 1A is smaller than the standard range represents a state where the display panel 2 is too close to the lenticular lens 4a and where the gap is therefore smaller than the allowable range. On the other hand, a case where the internal pressure of the display 1A is greater than the standard range represents a state where the display panel 2 is too far from the lenticular lens 4a and where the gap is therefore greater than the allowable range.

Finally, the control unit 41 causes the image capture moving mechanism 38 to move the image capture 37 to a retreated position and then stops driving the first suction pump 39a to open the inside of the decompression chamber 32 to the atmosphere (step S14). Then, the control unit 41 causes the chamber moving mechanism 36 to move the second chamber 32b of the decompression chamber 32 to the retreated position and opens the decompression chamber 32 (step S15). Thereafter, the display 1A is taken out of the decompression chamber 32 by a person such as a worker or a machine such as a robot and is conveyed to a full curing device, and then the adhesive member 3 inside the display 1A is fully cured.

In the above-described manufacturing process, the display 1A is formed by bonding the display panel 2 to the lens plate 4 in the decompressed atmosphere. During the process, the internal pressure of the internal space N formed by the display panel 2, the adhesive member 3, and the lens panel 4 is turned into the airtight state having a lower internal pressure than the atmospheric pressure. Since the gap varies depending on the pressure in the internal space N, i.e., the internal pressure of the display 1A, it is important to accurately obtain the internal pressure of the display 1A for the gap control.

Thereafter, the decompression chamber 32 is once opened and the inspection chart G1 is displayed on the display panel 2 of the display 1A. Then, the inside of the decompression chamber 32 is decompressed again. While the decompression is in progress, the image capture 37 captures images of the displayed inspection chart G1 through the lens plate 4 multiple times. Thereby, multiple captured images having different bright lines K (the image G2 shown in FIG. 7, for example) are obtained. Here, the bright line K changes depending on the decompression degree inside the decompression chamber 32. Subsequently, the chart variance and also its corresponding decompression degree are obtained for each of the captured images, then the change information of the chart variance is obtained based on the chart variance for all the captured images, and then the decompression degree at the change point A is obtained as the internal pressure of the display 1A. In this way, the internal pressure of the display 1A is indirectly measured by use of the inspection chart G1.

Last of all, a judgment is made as to whether or not the internal pressure of the display 1A is within the standard range. When the pressure is within the standard range, the display 1A is determined as a non-defective product. On the other hand, when the pressure is beyond the standard range, the display 1A is determined as a defective product. As described above, the product quality of the display 1A can be judged based on the internal pressure of the display 1A, which facilitates a display quality inspection of a three-dimensional image in the manufacturing process.

According to the embodiment of the present invention, as described above, the inspection chart G1 is displayed on the display panel 2, then images of the inspection chart G1 are captured multiple times along with an increase in the decompression degree inside the decompression chamber 32, then the change information of the chart variance is obtained by use of the captured images, and the decompression degree at the change point of the chart variance is obtained based on the change information of the chart variance thus obtained. The decompression degree thus obtained is the internal pressure of the display 1A. In this way, the internal pressure of the display 1A can be indirectly measured by use of the inspection chart G1, and thereby the internal pressure of the display 1A can be measured in a nondestructive manner. As a result, it is possible to determine whether or not the internal pressure of the display 1A is within the standard range, and to determine whether the display 1A is a non-defective product or a defective product by identifying whether or not the gap between the display panel 2 and the lens plate 4 is within the allowable range. In this way, it is possible to measure the internal pressure of the display 1A in a nondestructive manner, and as a consequence to prevent degradation in the display quality of a three-dimensional image without wasting the display 1A.

Moreover, the control unit 41 is allowed to control the display of the display panel 2 with the provision of: the signal interface 71 provided to the display panel 2; the connector 72 formed to be connectable to the signal interface 71; the control unit 41 serving as the generator for generating the inspection chart signal of the inspection chart G1; and the transmission line 73 configured to connect the connector 72 to the control unit 41 and to transmit the inspection chart signal generated by the controller 41 to the display panel 2. Therefore, the display panel 2 is caused to display the inspection chart G1 thereon by an operation from outside the decompression chamber 32.

In addition, the display panel 2 is caused to display the inspection chart G1 thereon while being irradiated with light. For this reason, even when the display panel 2 is a liquid crystal display panel, for instance, which cannot emit light by itself, the display panel 2 can display an image on the display panel 2 by means of irradiation from the light irradiator 43.

Moreover, manufacturing the display 1A by use of the above-described manufacturing apparatus 31 enables the gap between the lenticular lens 4a of the lens plate 4 and the first polarizing plate 2c of the display panel 2 to be set within the allowable range and the view angle error to be set within the allowable range. Therefore, the display 1A having excellent display quality of three-dimensional images can be produced easily.

It is to be noted that the present invention is not limited only to the above-described embodiment and various modifications are possible without departing from the scope of the invention. For example, some of the components may be removed from all of the components described in the embodiment. Moreover, some components across different embodiments may be combined with each other according to needs.

In the above-described embodiment, the liquid crystal display panel (LCD) is used as the display panel 2. However, the invention is not limited only to this panel, and different types of panels such as a plasma display panel (PDP), a field emission display panel (FED), a surface-conduction electron-emitter display panel (SED) may be used. Here, in the above-described embodiment, if the display panel 2 is capable of displaying an image by emitting light by itself, the display panel 2 may be connected to the control unit 41 and may be caused to display an image as needed. In this case, it is not necessary to use the light irradiator 43.

Meanwhile, the inspection chart G1 as shown in FIG. 5 is displayed in the above-described embodiment. However, the invention is not limited only to this configuration and the inspection image is not particularly limited. Finally, although various numerical values are cited in the above-described embodiment, those numerical values are examples and the invention is not limited only to those values.

What is claimed is:

1. A manufacturing apparatus for a three-dimensional image display formed in a way that a display panel including a plurality of pixels arranged within a plain of the display panel, and a lens plate provided with a lenticular lens are bonded together so as to seal the lenticular lens therein, the lenticular lens including a plurality of cylindrical lenses sequentially arranged in a width direction orthogonal to a ridge direction of the cylindrical lenses, the manufacturing apparatus for a three-dimensional image display comprising:

a decompression chamber;

a decompressor configured to decompress inside of the decompression chamber;

an image capture configured to capture an image of the display panel through the lens plate, the display panel bonded to the lens plate while being housed in the decompression chamber; and a control unit configured to control the display panel, the decompressor, and the image capture, wherein the control unit causes the display panel bonded to the lens plate while being housed in the decompression chamber to display an inspection chart designed to turn on a pixel row located in the center of a cylindrical lens width of each of the plurality of the cylindrical lenses, the control unit causes the image capture to capture images of the inspection chart a plurality of times along with an increase in a decompression degree inside the decompression chamber while causing the decompressor to decompress the inside of the decompression chamber in which the display panel bonded to the lens plate is housed, and the control unit obtains variance of luminance distribution in a direction orthogonal to the pixel row for each of the images captured by the image capture, then obtains change information of the variance that changes depending on a change in the decompression degree inside the decompression chamber, and obtains the decompression degree at a change point of the variance based on the obtained change information of the variance.

2. The manufacturing apparatus for a three-dimensional image display according to claim 1, further comprising:
a signal interface provided to the display panel;
a connector formed to be connectable to the signal interface; and
a transmission line configured to connect the connector to the control unit,
wherein the control unit generates an inspection chart signal of the inspection chart and transmits the generated inspection chart signal to the display panel through the transmission line.

3. The manufacturing apparatus for a three-dimensional image display according to claim 1, further comprising:
a light irradiator configured to irradiate the display panel with light,
wherein the control unit causes the display panel to display the inspection image while causing the light irradiator to irradiate the light.

4. A three-dimensional image display manufacturing method of manufacturing a three-dimensional image display in a way that a display panel including a plurality of pixels arranged within a plane of the display panel and a lens plate provided with a lenticular lens are bonded to each other so as to seal the lenticular lens therein, the lenticular lens including a plurality of cylindrical lenses sequentially arranged in a width direction orthogonal to a ridge direction of the cylindrical lenses, the three-dimensional image display manufacturing method comprising the steps of:
causing the display panel bonded to the lens plate while being housed in the decompression chamber to display an inspection chart designed to turn on a pixel row located in the center of a cylindrical lens width of each of the plurality of the cylindrical lenses;
capturing images of the inspection chart a plurality of times along with an increase in a decompression degree inside the decompression chamber while decompressing the inside of the decompression chamber in which the display panel bonded to the lens plate is housed; and
obtaining variance of luminance distribution in a direction orthogonal to the pixel row for each of the captured images, then obtaining change information of the variance that changes depending on a change in the decompression degree inside the decompression chamber, and obtaining the decompression degree at a change point of the variance based on the obtained change information of the variance.

5. The three-dimensional image display manufacturing method according to claim 4,
wherein the step of causing the display panel to display includes connecting a transmission line to a signal interface provided to the display panel, the transmission line being connected to a generator configured to generate an inspection chart signal of the inspection chart.

6. The three-dimensional image display manufacturing method according to claim 4,
wherein the step of causing the display panel to display includes causing the display panel to display the inspection chart while irradiating the display panel with light.

* * * * *